United States Patent
Burke

[15] 3,667,337
[45] June 6, 1972

[54] GRIP PLATE FOR WOODEN TRUSS MEMBERS

[72] Inventor: James Stanley Burke, 2675 S.W. 69th Court, Miami, Fla. 33155

[22] Filed: June 11, 1970

[21] Appl. No.: 45,330

[52] U.S. Cl. ............................................................85/13
[51] Int. Cl. ...................................F16b 15/00, A43b 23/20
[58] Field of Search ...................85/13, 11, 31, 26; 287/20.92 L; 52/DIG. 6

[56] References Cited

UNITED STATES PATENTS

| | | | |
|---|---|---|---|
| 649,761 | 5/1900 | Saltzkorn | 85/13 UX |
| 3,090,088 | 5/1963 | Foley et al. | 85/13 X |
| 2,974,378 | 3/1961 | Lidsky | 85/13 X |
| 3,485,518 | 12/1969 | Heise | 85/13 X |
| 3,304,106 | 2/1967 | McCormack | 85/13 X |
| 3,234,841 | 2/1966 | Adams | 85/13 |
| 3,295,405 | 1/1967 | Burke | 85/13 |
| 3,529,507 | 9/1970 | Adams | 85/13 |

FOREIGN PATENTS OR APPLICATIONS

| | | | |
|---|---|---|---|
| 651,149 | 10/1962 | Canada | 85/13 |
| 268,646 | 2/1964 | Australia | 85/13 |
| 801,322 | 12/1968 | Canada | 85/13 |

*Primary Examiner*—Ramon S. Britts
*Attorney*—Stowell & Stowell

[57] ABSTRACT

Grip plates or connectors for wooden structural members, preferably metal, provided with a plurality of integral punched projections in circular arrays or clusters about a center opening, the projections being adapted for impressing into and engaging in the body of the wood members. The projections are in the form of pointed teeth or prongs of alternating short and long lengths with different end configurations, with the tooth edges bevelled at their inside surfaces to impart outward deflection to the teeth upon impression into the material for enhanced retention therein.

1 Claims, 6 Drawing Figures

PATENTED JUN 6 1972  3,667,337

INVENTOR
JAMES STANLEY BURKE

BY Howell & Howell

ATTORNEY

GRIP PLATE FOR WOODEN TRUSS MEMBERS

BACKGROUND OF THE INVENTION

Grip plates or connectors for wooden structural members of the type of the present invention are generally known, and shown for example in my prior U.S. Pat. No. 3,295,405, entitled "Grip Plate For Wooden Truss Members," issued Jan. 3, 1967.

The present invention constitutes an improvement over the construction disclosed in my aforesaid patent.

SUMMARY OF THE INVENTION

The present invention is for an improved grip plate or connector for wooden structural members, having a plurality of integral wood penetrating punched projections in circular arrays or clusters about a center hole or opening. The projections are in the form of pointed teeth or prongs of alternating short and long lengths. The teeth are bevelled on their inside edges or surfaces to impart an outward deflection thereto upon impressing into the wood material for an enhanced gripping action. The long teeth are preferably of a barb shape for increased retentive securement and the difference in teeth lengths distributes penetration areas in the material. The configurations and sizes of the teeth facilitate manufacture including an initial impact embossing to provide sharp bevelled edges on the wood penetrating tooth portions with subsequent piercing and forming. A total circular area of the plate material is entirely utilized in the resultant tooth array or cluster. Increased strength, improved manufacturing procedures, and better appearance are provided over the construction of my prior patent.

Additional objects and advantages of the invention will be more readily apparent from the following detailed description of a preferred embodiment thereof when taken together with the accompanying drawing, in which.

Figure 1:
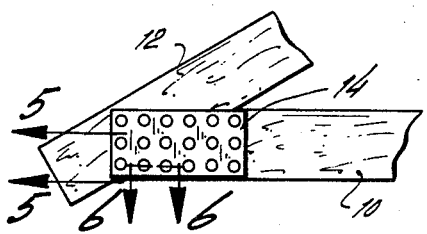
FIG. 1 is a side elevational view of a fragmentary portion of a conventional roof truss made of wooden members and embodying the grip plate of the invention.

Referring to the drawings, and, in particular in FIG. 1 thereof, a fragmentary portion of a typical roof truss is shown consisting of a bottom chord member 10, and a top chord member 12 which is in abutting relationship with the extended end of the bottom chord member. The complete roof truss, which is not shown, would include a further top chord member of complementary slope to that of the top chord member 12 which would join such member in abutting relationship at the roof apex and extend downwardly from such junction to abut the opposite extended end of bottom chord member 10. A plurality of web members may be provided intermediate the top and bottom chord members of the complete roof truss; such web members being in abutting contact at each end thereof with the chord members.

At each of the points of abutting contact between the lower chord member, the upper chord members, and the web members, there is provided a grip plate or gusset member generally designated 14. Each of the grip plates 14 may be identical in form and size; however, in general, the size and shape of each of the grip plates 14 is determined by the particular portion of the total load at the particular joint. By sizing the grip plates 14 for each of the particular abutting joints of the roof truss, it is possible to materially reduce the cost of the metal grip plates employed on a roof truss and also reduce assembly time without sacrificing the strength of the finished roof truss.

Each of the grip plates 14 generally comprises a metal plate member 16 which may consist of 12, 18 or, for example, 20-gauge, preferably galvanized, steel plate. Each of the plates 16 is provided with a plurality of wood penetrating members 18, each consisting of clusters or arrays of alternately arranged long teeth 20 and short teeth 22 in a circular arrangement or disposition. The teeth are formed from the plate 16 by piercing and punching and extend or project from the inner face 24 of each plate.

The teeth 20, 22 are shaped by an initial impact embossing step prior to piercing and forming. The short teeth 22 have a slightly curved triangular shape tapering to a wood penetrating point 26, and the long teeth 20 while generally triangular have a barb shape at 28, for increased retentive action in the wood material, and terminate in wood penetrating point 30. Each of teeth 20, 22 has sharp bevelled inside edges or surfaces at 32 formed by its impact embossing step, and, as will appear hereinafter this inside edge bevelling promotes an outward deflection of the teeth from the center of the punched hole 34 around which the teeth are arranged or clustered.

The impact embossing pattern and subsequent piercing and punching, using appropriate punch and die units, are so designed that a total circular area of plate material is entirely utilized in forming the resultant tooth array or cluster. Preferably the punch and die dimensions are such that the wood penetrating members 18 have as a base element an outer arcuate wall portion 36 merging into the teeth base, with the juncture of the teeth base with the plate being generally curvilinear as shown at 38. This configuration provides structural strength and additionally gives an enhanced appearance to the grip plate when installed and precludes exposed sharp edges at the formed arrays or clusters.

Figure 2:
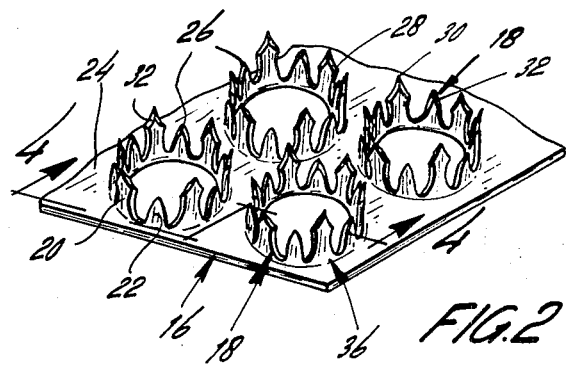
FIG. 2 is an enlarged perspective view of a portion of the grip plate of the invention.
Figure 4:
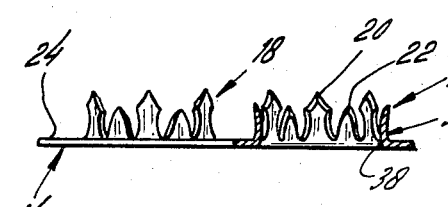
FIG. 4 is a sectional view, in elevation, taken on line 4—4 of FIG. 2.
Figure 3:
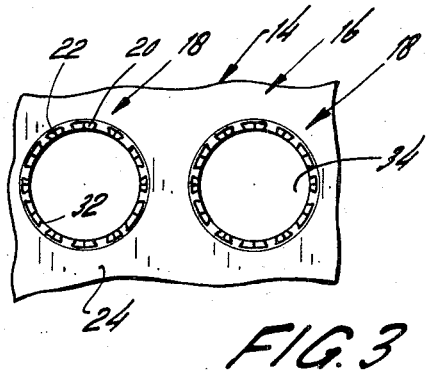
FIG. 3 is a top plan view of two of the gripping arrays or clusters of the plate.

Further, as illustrated in FIG. 2, each of the teeth 20, 22 is preferably curved slightly outwardly of its corresponding base section arcuate wall portion 36, in vertical cross section, to improve the gripping ability, in conjunction with the bevelled edges, of the wood penetrating members. FIGS., 5 and 6 illustrate the embedded configuration and disposition of the teeth in the wood material. The long teeth 20 penetrate the wood first upon assembly, followed by the short teeth. The pointed ends easily penetrate the material and the bevelled edges 32, in conjunction with the slight outward curving of the teeth, causes the teeth to deflect outward in a generally curvilinear path away from the center of hole 34.

Figure 5:
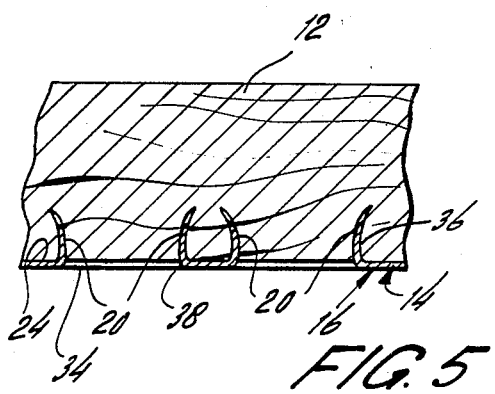
FIG. 5 is a fragmentary sectional view taken on line 5—5 of FIG. 1, showing the contours attained by the long teeth after application to a wooden truss member.
Figure 6:
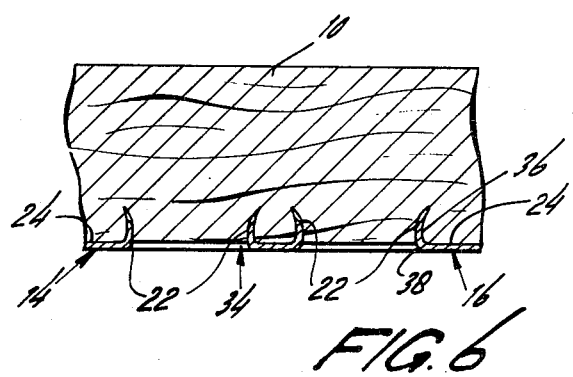
FIG. 6 is a view taken on line 6—6 of FIG. 1, and similar to FIG. 5, showing the attained contours of the short teeth.

The long teeth have greater depth of penetration than the short teeth and this distributes penetration and gripping areas or regions in the wood. The barb shape of the long teeth additionally increases the gripping action of the assembly as does the generally curvilinear path followed by the teeth in penetrating the wood. The gripping action of the teeth can be seen from FIGS. 5 and 6, from which it will be apparent that the grip plate is firmly held in surface contact with the wooden truss members 10, 12.

The number of wood penetrating members 18 for each grip plate may be varied depending upon the gauge of the metal of the grip plates, the dimensions of the teeth and the total load which the roof trusses or the like are adapted to withstand. The number of teeth in each cluster can also vary with design requirements and end usage of the grip plates.

If desired in order to improve the gripping ability of the grip plates and to further reduce the tendency of the plates to move away from their surface engagement with the truss members, particularly during transportation of a roof truss from the assembly plant to a job site, each of the plates can be provided with a plurality of bores adapted to receive stitching nails.

The grip plates constructed in accordance with the teachings of the present invention may be applied to wooden truss members according to any of the well known methods of attachment. That is, they may be applied manually by driving them into place with blows of a workman's hammer, in certain instances with an intervening block being utilized to distribute the impact forces over the plate area; or they may be applied by passing the truss members and overlying grip plates through one or more pinch roll assemblies.

From the foregoing description, it will readily be seen that the improved grip plate of the present invention fully accomplishes the aims and objects hereinbefore set forth.

I claim:

1. A connector for use in securing abutting wooden members together comprising a flat metal plate having opposing flat surfaces and spaced circular openings therein through said surfaces, each of said openings being entirely circumscribed by a cluster of projections lying in a common circle around the circumference of the opening and extending in a circular array from one of the surfaces of the plate and arranged substantially normal thereto, said projections being formed in an alternating series of first and second teeth having contiguous root portions forming a common circular base at the surface of the plate and integral therewith, said teeth of the first series being shorter than the teeth of the second series with the teeth of each series having coplanar outer ends, said shorter teeth lying in between the longer teeth and each having a triangular shape in elevation with opposing flat inner and outer faces and opposing sides beveled on their inner face edges and having a major root portion and a minor faired outer end, said major root portions of the shorter teeth being outwardly arcuate and the remainder of such teeth up to the outer ends being curved slightly outwardly away from the centers of the openings, said longer teeth having perpendicularly oblong body portions terminating in barbed shaped outer end portions that project beyond the outer ends of the shorter teeth, said outer ends of the shorter teeth extending substantially up to and terminating at said barbed shaped outer end portions, said longer teeth having opposing inner and outer flat faces and opposing sides beveled on their inner face edges and having arcuate root portions with the body and outer end portions being curved slightly outwardly of the root portions away from the centers of the openings.

* * * * *